United States Patent [19]

Kiesewetter et al.

[11] Patent Number: 5,660,448
[45] Date of Patent: Aug. 26, 1997

[54] METHOD FOR CONTROLLING THE BRAKING PROCESS IN A MOTOR VEHICLE

[75] Inventors: Wolfgang Kiesewetter, Waiblingen; Reinhard Helldörfer, Igelsdorf; Heinz Eyyinger, Oberasbach; Bernd Gebhart, Senkendorf; Thomas Just, Erlangen; Adam Weimann, Buxheim, all of Germany

[73] Assignees: Mercedes-Benz AG; Temic Telefunken Microelectronic GmbH, both of Germany

[21] Appl. No.: 557,776

[22] Filed: Nov. 13, 1995

[30] Foreign Application Priority Data

Nov. 11, 1994 [DE] Germany .......................... 44 40 291.0

[51] Int. Cl.⁶ .................... B60T 7/12; B60T 8/32
[52] U.S. Cl. .................................................. 303/155
[58] Field of Search .................... 303/155, 20, 113.4

[56] References Cited

U.S. PATENT DOCUMENTS

| 5,378,052 | 1/1995 | Yoshino | 303/155 X |
| 5,496,097 | 3/1996 | Eckert | 303/155 |
| 5,505,526 | 4/1996 | Michels | 303/155 X |
| 5,535,123 | 7/1996 | Rump et al. | 303/155 X |
| 5,564,797 | 10/1996 | Steiner et al. | 303/113.4 |
| 5,584,542 | 12/1996 | Klarer et al. | 303/113.4 |

FOREIGN PATENT DOCUMENTS

| 40 38 290 | 1/1992 | Germany . |
| 63-45336 | 9/1988 | Japan . |
| 4-121260 | 4/1992 | Japan . |
| 2 280 718 | 2/1995 | United Kingdom . |

OTHER PUBLICATIONS

French Search Report dated Jan. 23, 1997.
British Search Report dated Dec. 15, 1995.

*Primary Examiner*—Josie Ballato
*Attorney, Agent, or Firm*—Evenson, McKeown, Edwards & Lenahan P.L.L.C.

[57] ABSTRACT

In a method for controlling the braking process of a motor vehicle, nonlinear boosting of the braking force is performed if the actuating speed of the brake pedal exceeds a specified trigger threshold value. This trigger threshold value is formed as a function of the instantaneous speed of the motor vehicle, the pedal position of the brake pedal or a variable directly proportional thereto, and of a motor vehicle specific, brake dependent correction value.

10 Claims, 3 Drawing Sheets

METHOD FOR CONTROLLING THE BRAKING PROCESS IN A MOTOR VEHICLE

BACKGROUND AND SUMMARY OF THE INVENTION

The present invention relates to a method of controlling the actuation of emergency braking in a motor vehicle having a brake system in which the braking force determined by the position of the vehicle brake pedal is augmented when the actuation speed of the brake pedal exceeds a threshold value.

Braking processes of motor vehicles are initiated by an actuation of the brake pedal, which causes braking of the motor vehicle in proportion to the pedal position of the brake pedal. In emergency situations, very rapid and sharp braking of the motor vehicle is required to shorten the braking distance; however, this objective frequently cannot be achieved by the driver of the motor vehicle. It has therefore been proposed to detect an emergency situation from the manner in which the driver treads on the brake pedal (the pedal actuation speed) and to take suitable supportive measures in this case. That is, if the pedal actuation speed exceeds a certain specified threshold triggering value, an emergency situation is detected, and additional brake pressure is fed to the brake cylinders via a solenoid valve. In this manner, additional braking force is applied ("full braking") and insufficiently strong actuation of the brake pedal is thus compensated.

The disadvantage of such systems as described above is that variations in the properties of the brake system between different vehicles (e.g. due to tolerances across a model series) on the one hand, and changes in the response characteristics of the brake system in a particular motor vehicle (e.g., due to aging, brake lining wear etc.) on the other hand, are not taken into account in the determination of the trigger threshold value for the detection of an emergency situation. In practical operation, this results in a different trigger threshold value input in the case of different motor vehicles, or a shift in the trigger threshold value on the same motor vehicle, and hence in a different and often unacceptable assessment of emergency situations, frequently leading to excessively early switching in of the solenoid valve.

The object of the present invention is to provide an improved method for controlling the actuation of emergency braking which avoids these disadvantages.

This object is achieved according to the invention by using a threshold value for triggering automatic braking which takes into account not only of the travelling speed of the motor vehicle and of the position of the brake pedal, but also a "correction value" which reflects the effect of the individual properties of the brake system of the respective motor vehicle. To arrive at the correction value, during "normal" braking processes (i.e., in the range of low-level braking, not ABS braking), the braking force input is determined (e.g., by evaluation of the brake pedal travel or of the diaphragm travel of the brake booster), and the instantaneously acting braking force is determined as well (e.g., by determining the braking retardation by means of wheel speed sensors). A braking force transmission ratio is then calculated as the quotient of the specified braking force and the instantaneously acting braking force. This braking force transmission ratio is compared with a fixed predetermined standard value to determine a "relative value", being the quotient of the current braking force transmission ratio and the standard value. The correction value is then determined as a function of the relative value in such a manner, described hereinafter, that the input of the trigger threshold value always results in the same triggering behavior.

The values determined for the correction value are stored, and used to determine the trigger threshold value during subsequent braking processes. In the most general case, the time variation of the relative value during the braking process is taken into account, and the required correction value is determined by reference to a family of characteristics, which vary with time during the braking process, dependent on the relative value. In addition, it is possible, during a braking process, to determine an average relative value of the braking force transmission ratio, and to assign to this ratio correction value taken from a characteristic which reflects the relationship between the correction value and the relative value averaged over the course of the braking process. The time dependent or time independent (average) relative values of different braking processes can furthermore be stored and evaluated (e.g., for long term consideration or in order to detect changes).

The relationship between the respective relative values and the associated correction values is generally nonlinear; often, however, as a practical matter it is satisfactory to assume a linear relationship between the relative value determined and the required correction value. In the simplest case, in fact, the correction value corresponds exactly to the relative value.

The trigger threshold value is advantageously constant for one motor vehicle, and hence also for different boundary conditions and ambient conditions and for different motor vehicles of a model series, even in the case of different brake systems. This means that the assessment of an emergency situation is always identical, which increases both driving safety, and the degree of acceptance of the method by the user of the motor vehicle.

Other objects, advantages and novel features of the present invention will become apparent from the following detailed description of the invention when considered in conjunction with the accompanying drawings.

DETAILED DESCRIPTION OF THE DRAWINGS

To determine the data for the relative values and the correction values, the quotients of the brake pedal travel (specified desired braking force BKD) and the actual braking achieved (instantaneously acting braking force BKA) are formed as the braking force transmission ratio BKTR at continuous time intervals during "normal" braking processes (braking level about 10–30% of the maximum value, e.g., braking retardation less than 4 m/s$^2$): BKTR=BKD/BKA.

For a braking process, these quotients are either determined as a function of time t during the braking process (i.e., BKTR=BKTR(t)), or combined to give a time independent average value for the respective braking process. The values determined for the braking force transmission ratio BKTR can be stored for long term consideration in a memory. The storage intervals can, for example, be in a range of 3 to 500 ms. The beginning of the braking process (e.g., within 1 s) is of particular significance for the evaluation and can therefore be provided with finer time division. Time dependent or time independent average values can be formed from these quotients BKTR, stored in a nonvolatile manner, of various braking processes and can be stored. Based on the deviation of the calculated quotients BKTR from the predetermined ideal standard values $BKTR_{std}$ for the boosting of the brake system, relative values $RV=BKTR/BKTR_{std}$ are formed, and the required correction values CV are determined as a function of these time dependent or time-independent relative values RV, so that (irrespective of the state of the brake system) the same trigger threshold value is always achieved. The respective correction value CV for a particular relative value RV is determined empirically, and the relationship determined for the various relative values RV is stored for subsequent use, e.g., in a (two-dimensional) family of characteristics or (if the time dependence is not taken into account) in a (one-dimensional) characteristic.

Figure 1:
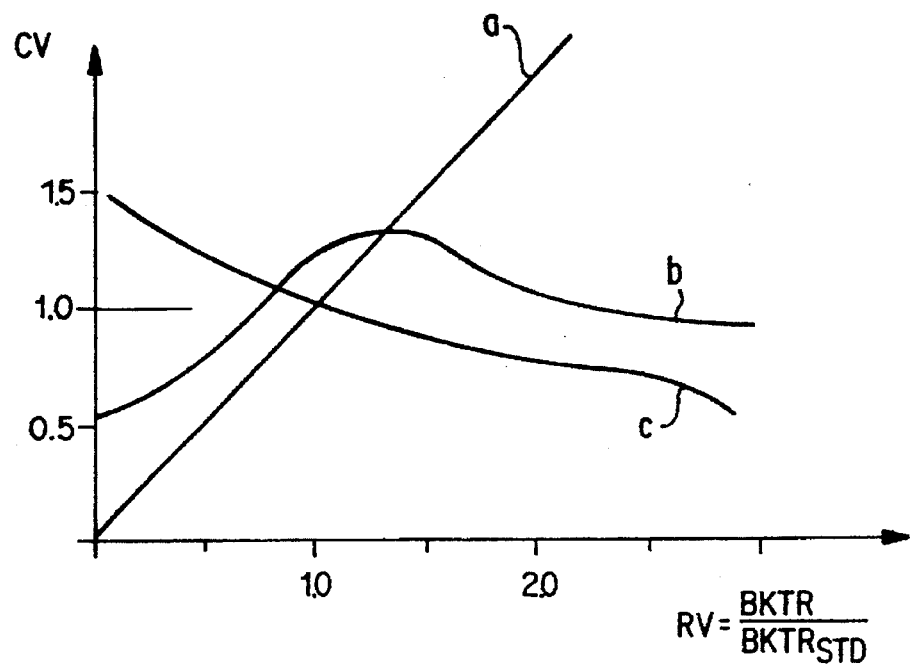
FIG. 1 shows characteristics for the relationship between the relative value and the required correction value.

FIG. 1 illustrates a number of alternative functional relationships which can be used as characteristics to determine a correction value CV from calculated relative value RV. According to the characteristics shown in FIG. 1, there can be a linear relationship (curve a) between the relative value RV and the correction value CV in the simplest case. Generally, however, the relationship is nonlinear (curve b, curve c).

Figure 2:
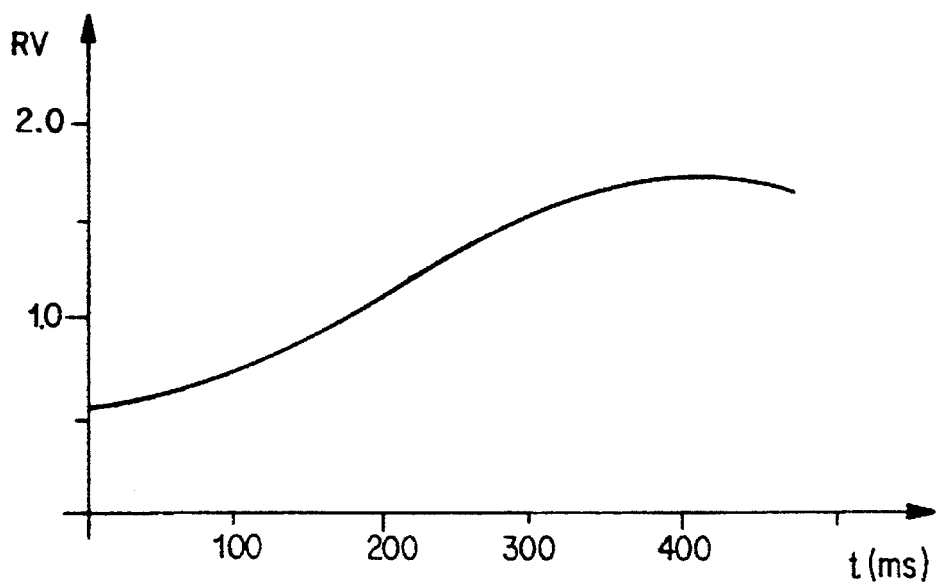
FIG. 2 shows, by way of example, the time dependence of the relative value during a braking process.

FIG. 2 shows, by way of example, the time variation of the relative value RV as a function of time during the braking process. The various relative values RV can now be combined to give an average value for the respective braking process or used to determine time-dependent correction values CV, e.g., the relative values RV during a braking process can be between the values RV=0.5 and RV=2.0.

Figure 3:
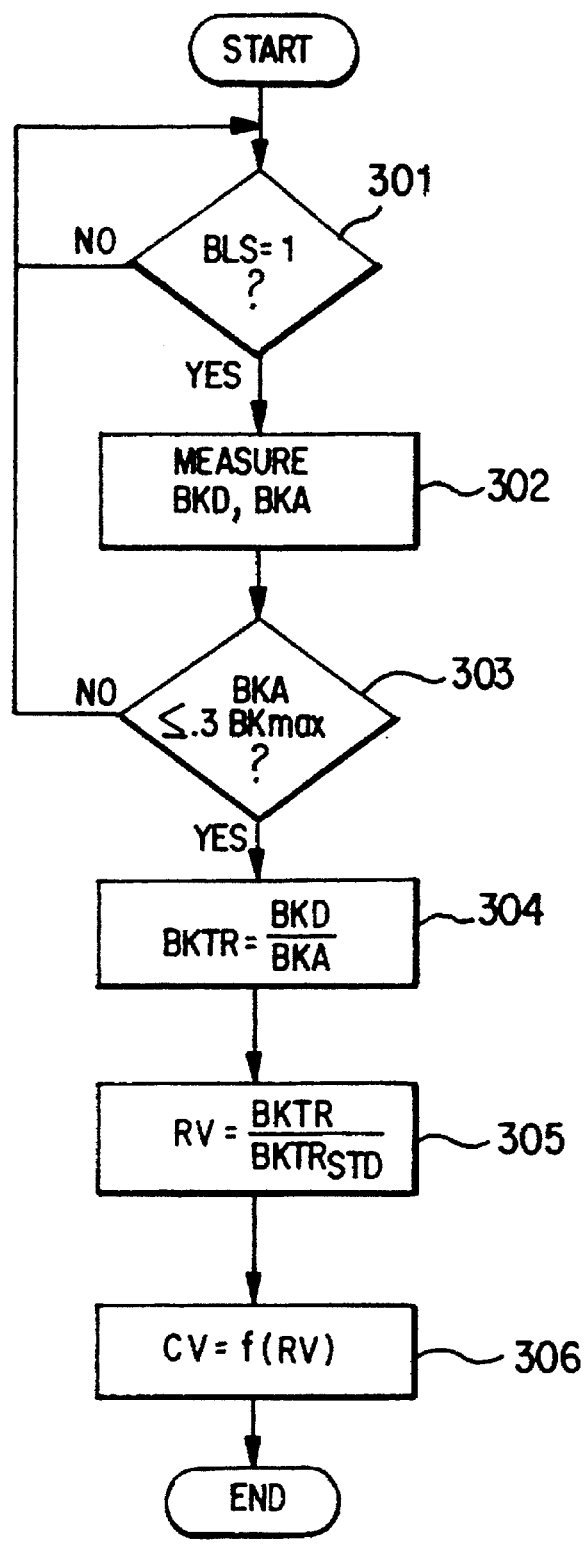
FIG. 3 is a flow chart which shows the process for determining correction values for adjusting the triggering threshold value according to the invention.

FIG. 3 is a flow chart which illustrates the process steps for calculation of the correcting values according to the process described hereinabove. At step 301, a determination is made whether the brakes are being applied, by reference to the status of the brake light switch BLS. (When BLS=1, it is determined that the brakes are being actuated.) Thereafter, in step 302, the actual and desired braking values BKA and BKD are measured, and at step 303, BKA is compared with a maximum braking value $BK_{max}$. If BKA is less than or equal to approximately 30% of the maximum braking force $BK_{max}$, the braking force transmission ratio BKTR is determined in step 304 as the ratio of BKD and BKA. (If BKA is greater than 30% of $BK_{max}$ in step 303, processing returns to step 301, as the cycle is repeated.)

In step 305, the relative value RV is determined by comparing the calculated BKTR to a predetermined ideal standard value $BKTR_{std}$. In particular, RV is determined as the ratio of BKTR and $BKTR_{std}$. Finally, in step 306, the correction value CV is determined as a function of the relative value, by reference to a desired characteristic curve such as illustrated in FIG. 1.

Figure 4:
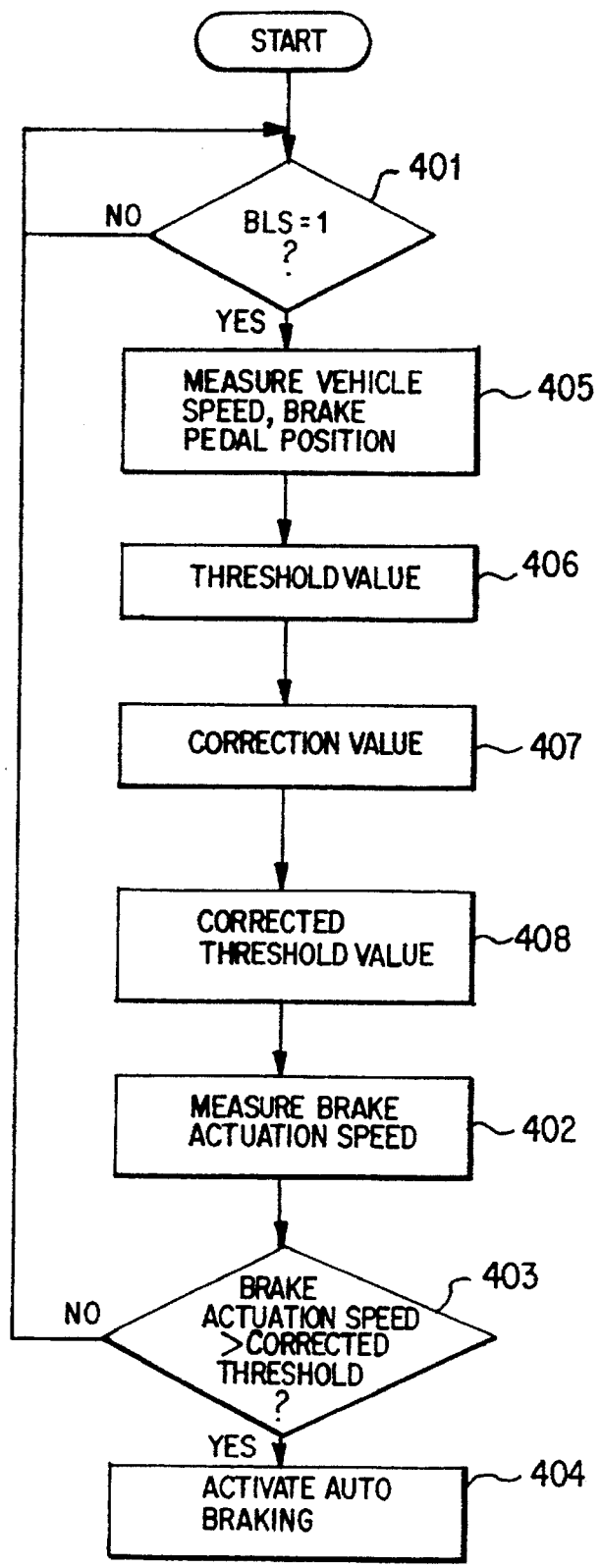
FIG. 4 is a flow chart which shows the actuation of automatic braking according to the invention.

FIG. 4 illustrates the procedure for activation of automatic braking using the corrected threshold value determined in accordance with FIG. 3. As shown in FIG. 4, the process begins at step 401, with a determination of whether the brakes are being activated. If so, the vehicle speed and brake pedal position are measured in step 405, and a threshold value for the activation of automatic braking is set in a conventional manner according to the known prior art in step 406. Thereafter, in step 407 a correction value is determined in the manner depicted in FIG. 3, and is used to form a corrected threshold value in step 408. The brake actuation speed is measured in step 402, and compared with the corrected threshold value in step 403. If the brake actuation speed exceeds the corrected threshold value, automatic braking is activated in step 404. If they brake actuation speed does not exceed the corrected threshold value in step 403, processing returns to step 401, and the cycle is repeated.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for controlling a braking process in a motor vehicle of the type in which nonlinear boosting of the braking force is performed if an actuating speed of a vehicle brake pedal exceeds a specified trigger threshold value, said method comprising the steps of:

measuring vehicle speed and a brake pedal position for said vehicle;

determining a threshold value for triggering boosting of braking force as a function of said vehicle speed and a pedal position of said brake pedal or a variable directly proportional thereto;

determining a vehicle specific brake dependent correction value for said vehicle; and determining a corrected threshold value as a function of said determined threshold value and said vehicle specific brake dependent correction value; and triggering boosting of braking force as a function of said corrected threshold value.

2. Method according to claim 1, wherein said step of determining a vehicle specific brake dependent correction value comprises the further steps of:

determining a desired braking force from a braking force input during a braking operation;

determining actual braking force during a braking operation;

determining a current braking force transmission ratio based on said desired braking force and said actual braking force;

determining a relative value for the braking force transmission ratio as a quotient of the current braking force transmission ratio and a predetermined standard braking force transmission ration for the motor vehicle; and determining said correction value as a function of said relative value.

3. Method according to claim 1, wherein the correction value is chosen so that different motor vehicles have the same trigger threshold value.

4. Method according to claim 1, wherein a time variation of the current braking-force transmission ratio is determined and evaluated during a braking process as a function of the braking force input.

5. Method according to claim 4 wherein relative values exhibiting a time dependence on the time variation of the braking process are formed during a braking process.

6. Method according to claim 4, wherein an average value for the relative value is formed during a braking process.

7. Method according to claims 4, wherein average values for the relative value are formed using a plurality of successive braking processes.

8. Method according to claim 1, wherein the braking force input is determined from pedal travel of the brake pedal.

9. Method according to claim 1, wherein the braking force input is determined from diaphragm travel of a brake booster.

10. Method according to claim 1, wherein the actual braking force is determined from the time variation of wheel speed.

* * * * *